United States Patent
Uchida et al.

(10) Patent No.: US 7,232,326 B2
(45) Date of Patent: Jun. 19, 2007

(54) CARD CONNECTOR

(75) Inventors: Shiniji Uchida, Yokohama (JP); Taichiro Miyao, Yokohama (JP)

(73) Assignee: J.S.T. Mfg. Co., Ltd., Osaka (JP)

(*) Notice: Subject to any disclaimer, the term of this patent is extended or adjusted under 35 U.S.C. 154(b) by 0 days.

(21) Appl. No.: 11/342,115

(22) Filed: Jan. 27, 2006

(65) Prior Publication Data

US 2006/0166541 A1    Jul. 27, 2006

(30) Foreign Application Priority Data

Jan. 27, 2005  (JP) .............................. 2005-020368

(51) Int. Cl.
H01R 13/62    (2006.01)
(52) U.S. Cl. ..................................... 439/326
(58) Field of Classification Search ................ 439/326, 439/330, 331, 159, 630
See application file for complete search history.

(56) References Cited

U.S. PATENT DOCUMENTS

| | | | |
|---|---|---|---|
| 5,320,552 | A | 6/1994 | Reichardt et al. |
| 6,174,188 | B1 | 1/2001 | Martucci |
| 6,234,810 | B1* | 5/2001 | Schnell et al. ............. 439/76.1 |
| 6,273,739 | B1 | 8/2001 | Konno et al. |
| 6,547,138 | B1* | 4/2003 | Braun et al. ................ 235/441 |
| 6,890,203 | B2* | 5/2005 | Matsunaga et al. ......... 439/331 |
| 7,063,552 | B2* | 6/2006 | Matsunaga et al. ......... 439/326 |
| 2002/0052147 | A1 | 5/2002 | Sato |
| 2002/0119691 | A1 | 8/2002 | Sato |
| 2003/0190832 | A1 | 10/2003 | Matsunaga et al. |

FOREIGN PATENT DOCUMENTS

| | | |
|---|---|---|
| EP | 0 702 460 | 3/1996 |
| GB | 2 342 788 | 4/2000 |
| JP | 8-87582 | 4/1996 |
| JP | 2860362 | 12/1998 |
| JP | 2000-100502 | 4/2000 |
| JP | 2000-260537 | 9/2000 |
| JP | 2000-340280 | 12/2000 |
| JP | 2002-134234 | 5/2002 |
| JP | 2002-237356 | 8/2002 |
| JP | 2003-086302 | 3/2003 |
| JP | 2003-303645 | 10/2003 |
| JP | 2004-228694 | 8/2004 |

* cited by examiner

Primary Examiner—Alexander Gilman
(74) Attorney, Agent, or Firm—Jordan and Hamburg LLP

(57) ABSTRACT

A card connector can ensure credibility of electric contact between electrodes of an inserted card and contact elements against impact and vibration as well as lowering of the height. The card connector has a main body unit having a panel portion including contact elements with a spring property, and having a rising portion on either side, the rising portion having at its front portion a notch portion followed by a hook portion, and having at its rear portion a generally L-shaped see-through hole; and a tray having a card holding portion for inserting a card, and having a front-portion tab and a rear-portion tab on either side, wherein when the tray is closed, the front-portion tab is in a position for engaging with the hook portion and the rear-portion tab is in a position at an end of a horizontal portion of the generally L-shaped see-through hole to regulate the movement of the tray in the back-and-forth direction.

12 Claims, 5 Drawing Sheets

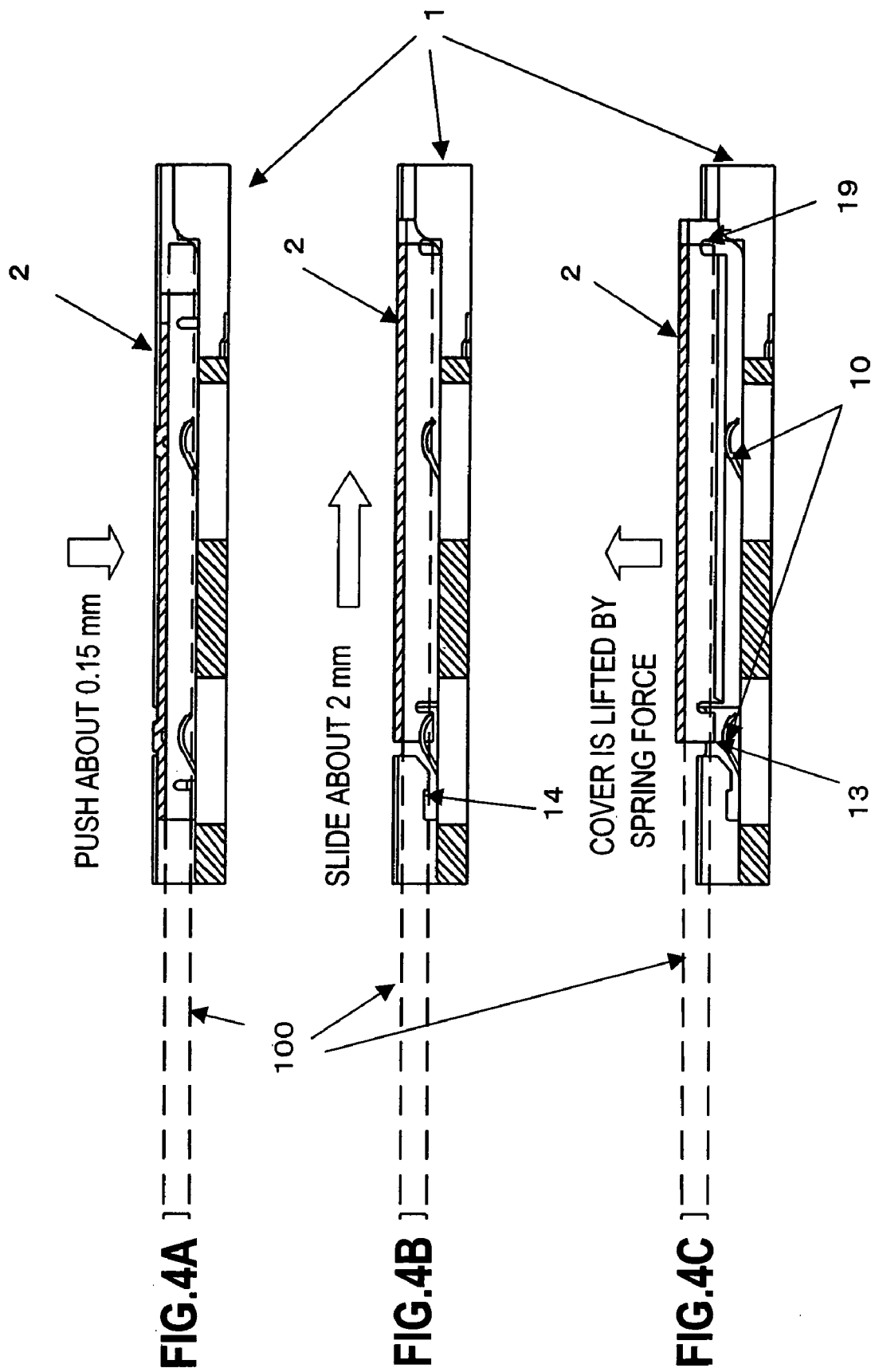

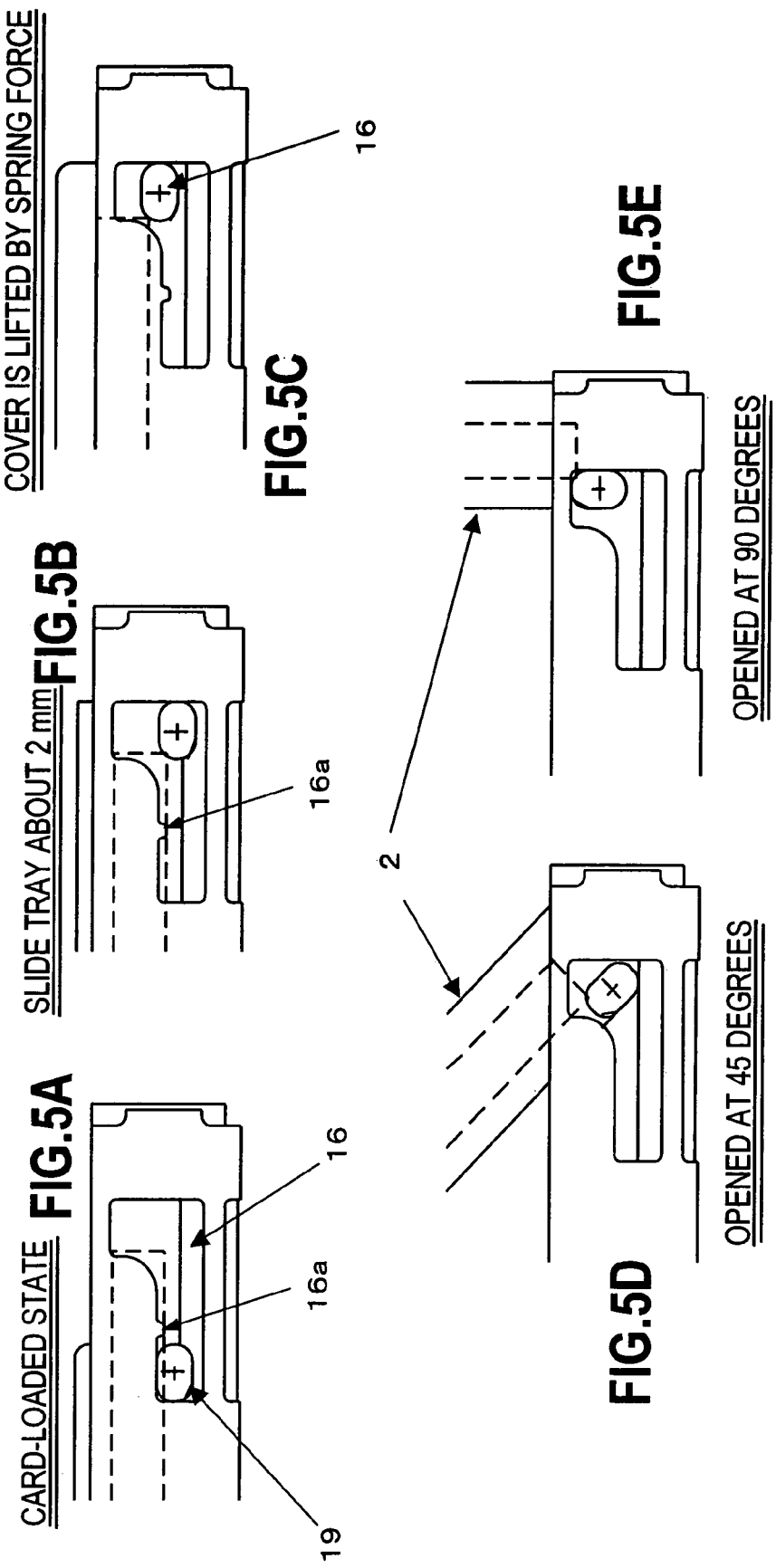

CARD CONNECTOR

CROSS-REFERENCE TO RELATED APPLICATIONS

This application is based upon and claims the benefit of priority from the prior Japanese Patent Application No. 2005-20368, filed on Jan. 27, 2005, the entire contents of which are incorporated herein by reference.

BACKGROUND OF THE INVENTION

1. Field of the Invention

The present invention relates to a card connector. More particularly, the present invention relates to a connector suitable for connecting a subscriber identity module (SIM).

2. Description of the Related Art

If a manufacturer/distributor of a cellular phone (portable telephone) terminal is different from a telecommunications carrier, a card-type subscriber identity module (hereinafter, referred to as a SIM card) is used for authenticating a subscriber of the telecommunications carrier.

For example, as described in Japanese Patent Application Laid-Open Publication No. 2004-228694, a connector is provided on a back side of a main body of a portable telephone terminal. The connector has a contact element to be contacted with an electrode of the SIM card and when the SIM card is inserted into the connector, the contact element is contacted with the electrode of the SIM card to enable to read a subscriber identity code stored in the SIM card.

Generally, a back-side cover used also as a battery is configured to be closed while the SIM card is inserted into the connector. When used in such a state, due to a requirement for miniaturizing and thinning a portable telephone terminal device, the card connector is also required to be thinned inevitably. A dimensional tolerance of the card inserted into the card connector is on the order of ±0.1 mm. Therefore, while being inserted into the connector, the SIM card may be rattled in the connector.

Such rattles generates intermittent discontinuity of power supply due to poor contact, which generates voltage drop, and has a considerable effect on a speech quality as a system.

As a specific configuration example of the SIM card connector, an invention described in Japanese Patent Application Laid-Open Publication No. 2000-260537 is known. FIG. 1 is a perspective view of a SIM card connector described in Japanese Patent Application Laid-Open Publication No. 2000-260537. The SIM card connector is constituted by a cover 17 holding the SIM card on both sides and a contact support unit 14 comprising contact elements 35 with a spring property disposed on a panel portion 18.

The cover 17 has arms 55 at one end, and a hinge portion 56 at the tips of the arms 55 engage with openings 26 of support blocks 24 of the contact support unit 14. The cover 17 has locking tabs 48 at the other end.

The contact support unit 14 has the support blocks 24 and slots 30 on the other side.

When the SIM card 1 is held and the cover 17 is closed, the cover 17 is rotated around a turning axis 60 of the hinge portion 56 against the spring property of the contact elements 35 and is brought down to the contact support unit 14. The cover 17 is slid to the slots 30 to insert the locking tabs 48 at the end of the cover into the slots 30 of the contact support unit 14.

With such a configuration, the SIM card can be held with the contacts of the SIM card in contact with the contact elements 35.

In the invention described in Japanese Patent Application Laid-Open Publication No. 2000-260537, engagement and retention between the cover 17 and the contact support unit 14 is achieved by applying resistance against movement of the cover with a spring property of the contact elements 35 while the locking tabs 48 at the end of the cover are inserted into the slots 30 of the contact support unit 14 and by applying a cam 260 provided in the opening 26 to the hinge means 56 to apply resistance against movement in the horizontal direction (back-and-forth direction).

Therefore, the invention described in Japanese Patent Application Laid-Open Publication No. 2000-260537 is configured to open, close and hold the cover solely with movement of the cover 17 in the back-and-forth direction. Therefore, impact or vibration in the back-and-forth direction may slide and move the cover to release the engagement between the cover and the contact support unit 14. In such a case, the credibility of the electric connection is damaged between the electrodes of the SIM card and the contact elements 35, and a system is affected by signal discontinuity, voltage drop, etc.

In the invention described in Japanese Patent Application Laid-Open Publication No. 2000-260537, the turning of the cover 17 is configured to be performed around the hinge means 56 provided at the ends of arms 55 extending from the cover 17. The vertical width of the openings 26 of the support blocks 24 must have a size allowing the hinge means 56 to slide.

Therefore, in consideration of lowering the height of the card connector as a whole, if the height of the support blocks 24 is lowered, the wall thickness around the openings 26 must be thinned because of the vertical width of the openings 26. In such a case, in combination with the use of the arms 55, the strength is inevitably reduced. Therefore, the lowering of the height of the card connector is constrained.

BRIEF SUMMARY OF THE INVENTION

It is therefore the object of the present invention to provide a card connector which resolves such disadvantages, which maintains the lowering of the height and which can ensure the credibility of the electric contact between the electrodes of the inserted card and the contact elements against impact and vibration.

In order to achieve the above object, according to a first aspect of the present invention there is provided a card connector comprising a main body unit; and a tray, wherein the main body unit has a panel portion having contact elements with a spring property and has a rising portion on either side, wherein the rising portion has at its front portion a notch portion followed by a hook portion, wherein the rising portion has at its rear portion a generally L-shaped see-through hole, wherein the tray has a card holding portion for inserting a card and a front-portion tab and a rear-portion tab on either side, and wherein when the tray is closed, the front-portion tab is in a position for engaging with the hook portion and the rear-portion tab is in a position at an end of a horizontal portion of the generally L-shaped see-through hole to regulate the movement of the tray in the back-and-forth direction.

To achieve the above object, a second aspect of the present invention provides the card connector of the first aspect wherein the tray is made of a this plate and wherein the front-portion tab and the rear-portion tab have the same thickness as the this plate as portions of the tray.

To achieve the above object, a third aspect of the present invention provides the card connector of the first aspect wherein the main body unit 1 is made of mold resin, and wherein a metal plate reinforces the exterior of the rising portion on either side of the main body unit, the hook portion and the generally L-shaped see-through hole.

To achieve the above object, a fourth aspect of the present invention provides the card connector of the first aspect, comprising a convex portion on an upper side of a horizontal portion of the generally L-shaped see-through hole, the convex portion being engaged with the rear-portion tab to regulate the movement of the tray in the horizontal direction when the tray is closed.

To achieve the above object, a fifth aspect of the present invention provides the card connector of any one of the first to fourth aspects, comprising a spring member in the card holding unit, the spring member extending from a surface confronting the panel unit, wherein as a process of a transition from a state of the tray closed to an opened state: an upper surface of the tray is pressed down against a spring property of the spring member; in the pressed-down state, the front-portion tab is slid backward until the front-portion tab coincides with a position of the notch portion to put the tray into a lifted state; and when the front-portion tab is released from the notch portion and lifted upwardly, the rear-portion tab is rotated in the vicinity of a corner between a horizontal portion and a vertical portion of the generally L-shaped see-through hole.

To achieve the above object, a sixth aspect of the present invention provides the card connector of the fifth aspect wherein when a card is inserted into the tray, an upper surface of the tray is pressed down against a spring property of the contact elements applied via the inserted card, in addition to a spring property of the spring member.

The features of the present invention will become more apparent from an embodiment described below with reference to the accompanying drawings.

A card connector according to the present invention can ensure credibility of electric contact between electrodes of an inserted card and contact elements against impact and vibration as well as can maintain the lowering of the height.

BRIEF DESCRIPTION OF THE DRAWINGS

The above and other objects, aspects, features and advantages of the present invention will become more apparent from the following detailed description when taken in conjunction with the accompanying drawings, in which:

FIGS. 4A to 4C are diagrams describing a process of a transition from a state of the tray 2 closed against the main body unit 1 to an opened state; and FIGS. 5A to 5E are diagrams showing the states of the rear-portion tab 19 of the tray 2 correspondingly to FIGS. 4A to 4C.

DETAILED DESCRIPTION OF THE INVENTION

Figure 1:
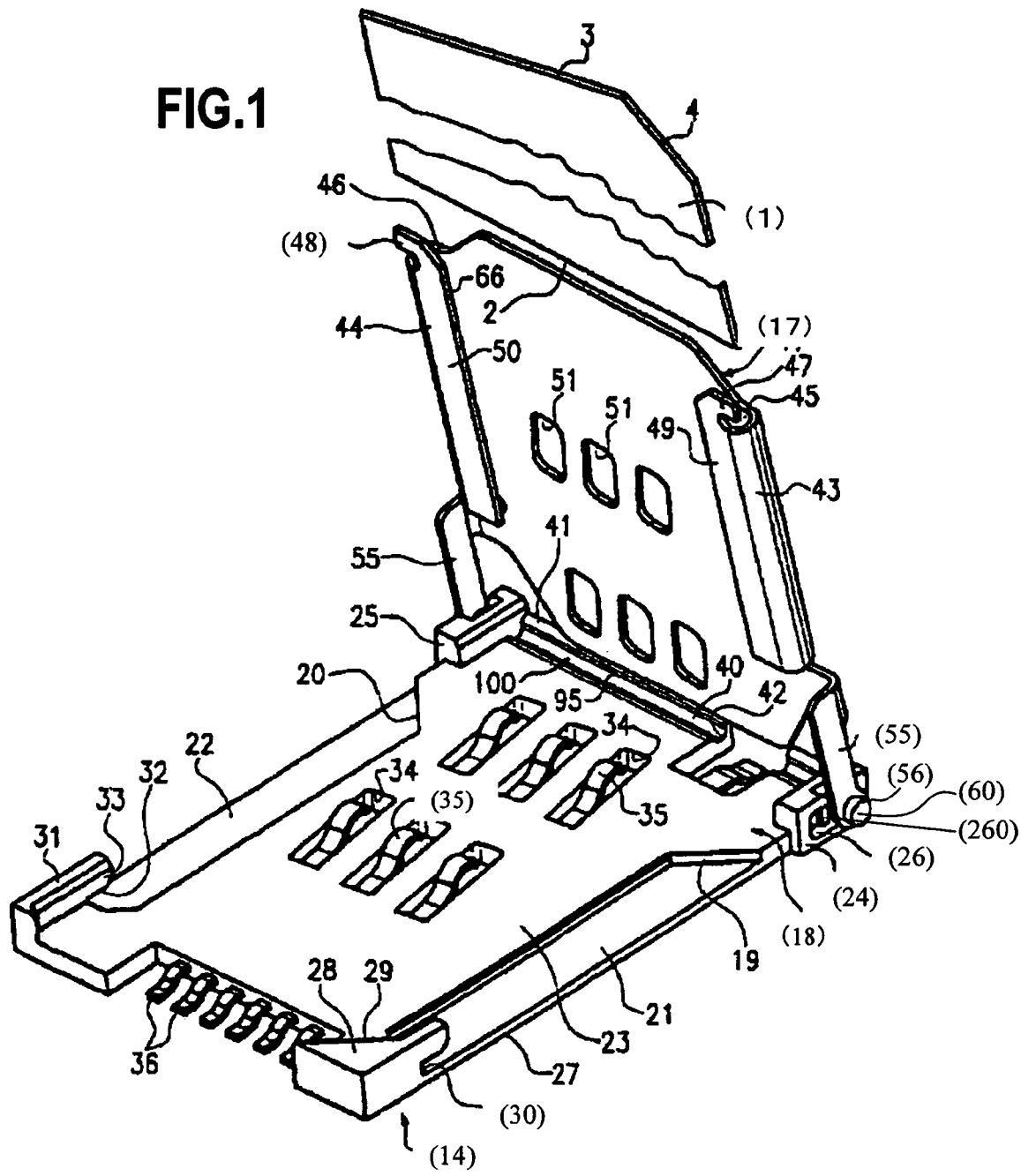
FIG. 1 is a perspective view of a SIM card connector described in Japanese Patent Application Laid-Open Publication No. 2000-260537.

An exemplary embodiment of the present invention will now be described with reference to the accompanying drawings. The embodiment is for the purpose of describing the present invention and the technical scope of the present invention is not limited to the embodiment. In descriptions below, reference numerals are different from those used in FIG. 1.

Figure 2:
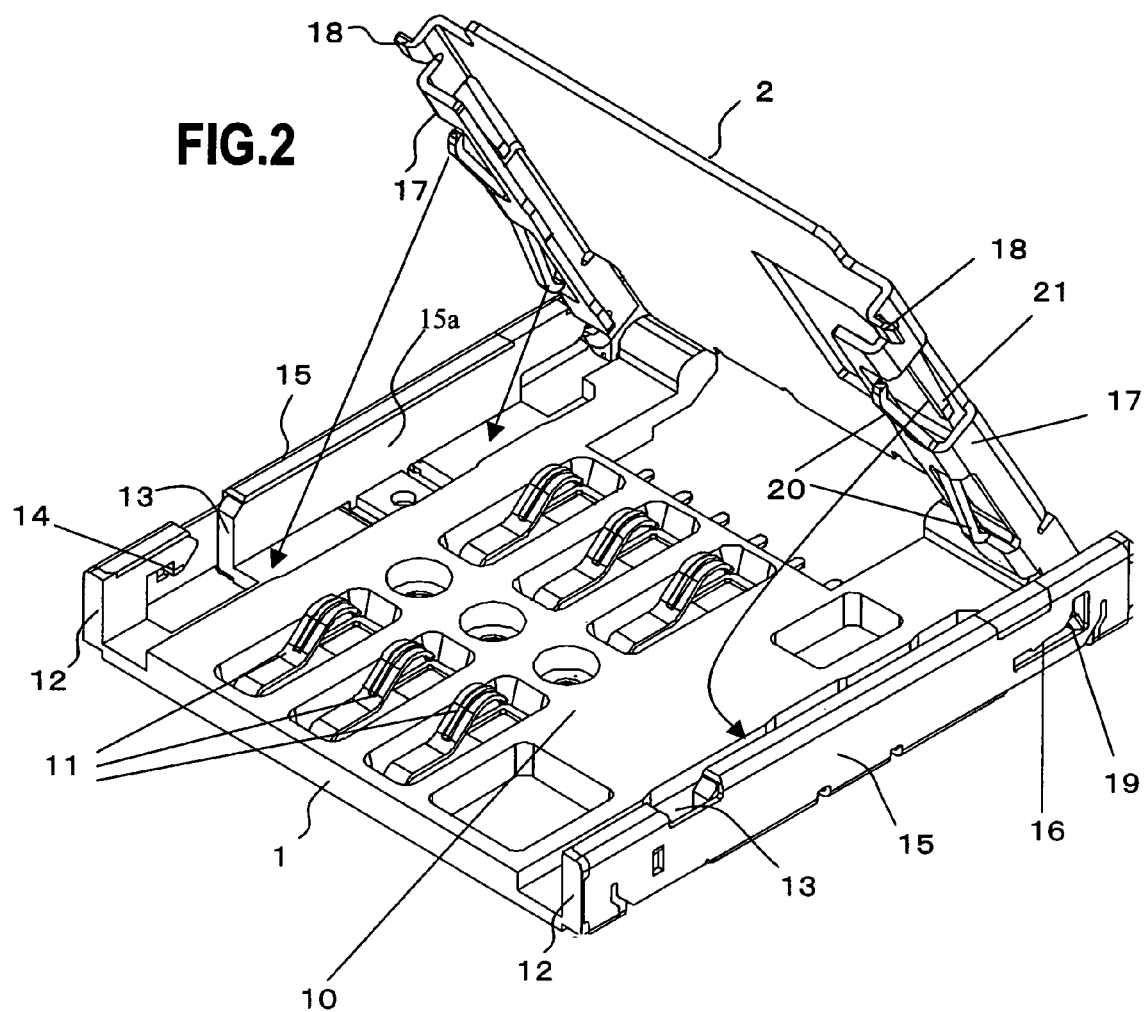
FIG. 2 is a perspective view of a configuration example of a card connector according to the present invention.

FIG. 2 is a perspective view of a configuration example of a card connector according to the present invention. The card connector is constituted by a body unit 1 and a tray (cover) 2 for inserting a card having a memory and a function unit, such as a SIM card.

The main body unit 1 is formed with resin mold. When doing this, the main body unit 1 is integrally formed such that a panel portion 10 has contact elements 11 with a spring property. A plurality of corresponding leads coupled to a plurality of the contact elements 11 is pulled out of the main body unit and, when the card connector is mounted on a device, the plurality of the leads acts as connection terminals electrically connected to a circuit substrate on the device side.

The main body unit 1 has a rising portion 12 on either side and has a notch portion 13 followed by a hook portion 14 at a front portion of the rising portion 12. The main body unit 1 has a generally L-shaped see-through hole 16 at a rear portion of the rising portion 12 on either side. The generally L-shaped see-through hole 16 has a horizontal portion along a length direction and a vertical portion.

In the rising portion 12, preferably, a metal cover 15 reinforces the exterior, the hook portion 14 and the see-through hole 16.

Figure 3:
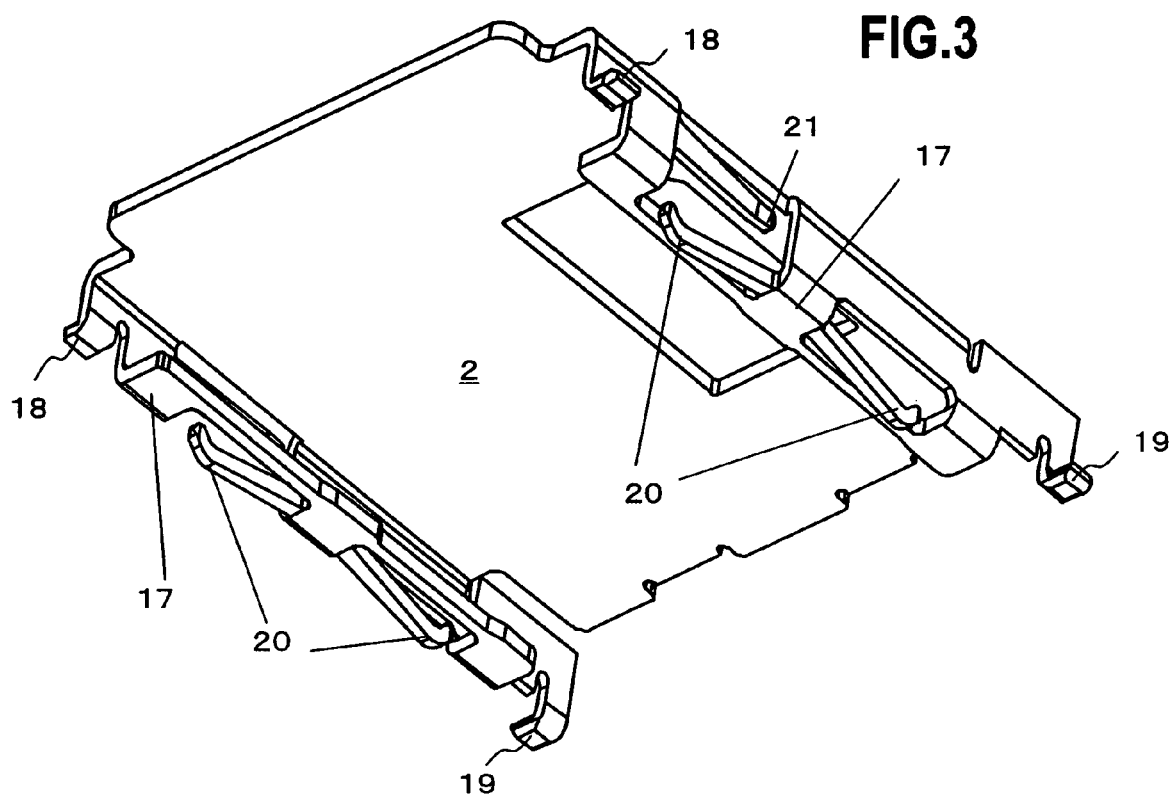
FIG. 3 is a diagram showing a shape of the tray 2 viewed from inside.

On the other hand, the tray 2 is composed of a thin plate, which is made of stainless-steel or formed with mold resin as an example. FIG. 3 is a diagram showing a shape of the tray 2 viewed from inside. As shown in FIG. 3, the tray 2 has a card holding portion 17 with a U-shaped cross section on either side. The card holding portion 17 on either side has tabs 18, 19 made of the same thin plate facing outwardly at a front portion and a rear portion. As a feature of the embodiment of the present invention, the card holding portion 17 has a spring member 20 extending from a surface opposite to the panel portion of the main body unit 1.

The rear-portion tab 19 is inserted into the generally L-shaped see-through hole 16 formed in the rising portion 12 on either side of the main body unit 1 to couple the main body unit 1 and the tray 2. Therefore, the tray 2 can rotate around the rear-portion tab 19 in the vicinity of a corner portion where the horizontal portion intersects with the vertical portion of the see-through hole 16.

One of the features of the present invention is a relationship between the rear-portion tab 19 and the generally L-shaped see-through hole 16 formed in the rising portion 12 of the main body unit 1.

FIGS. 4A to 4C are diagrams describing a process of a transition from a state of the tray 2 closed against the main body unit 1 to an opened state and represent a cross section of a center portion.

FIG. 4A shows a state of the tray 2 closed against the main body unit 1. The tray 2 is pushed upwardly by a spring force of the spring member 20 extending from the card holding portion 17 in this state. If the SIM card 100 has been inserted in the tray 2, an upward pressing pressure is applied also by a spring property of the contact elements 11 via the SIM card 100. In this state, the front-portion tab 18 of the tray 2 is engaged with the hook portion 14 of the rising portion 12 of the main body unit 1. On the other hand, the states of the rear-portion tab 19 of the tray 2 are shown in FIGS. 5A to 5E correspondingly to FIGS. 4A to 4C.

In FIGS. 5A to 5E, FIG. 5A shows a state of the generally L-shaped see-through hole 16 formed in the rising portion 12 and the tab 19, corresponding to FIG. 4A. As shown in FIG. 5A, when the tray 2 is closed and the card is loaded, the tab 19 is located in the vicinity of an end of the horizontal portion of the generally L-shaped see-through hole 16. A small convex portion 16a is formed on an upper surface of the horizontal portion of the generally L-shaped see-through hole 16.

To the tray 2, a pressing pressure is applied by the spring force of the spring member 20 as well as by the spring property of the contact elements 11 via the SIM card if the SIM card 100 has been inserted. In this way, upward movement of the front-portion tab 18 and the rear-portion tab 19 of the tray can be strongly regulated by the hook portion 14 and the horizontal portion of the generally L-shaped see-through hole 16, respectively. At the same time, backward movement of the front-portion tab 18 and the rear-portion tab 19 is regulated by the hook portion 14 and the small convex portion 16a formed on the upper surface of the horizontal portion of the generally L-shaped see-through hole 16, respectively.

Therefore, in the inventive configuration, the contact between the electrodes of the SIM card and the contact elements 11 is solidified and cannot be slid at the same time. In this way, the tray 2 can be prevented from being easily slid by impact or vibration in the back-and-forth direction to make the contact between the contact elements 11 and the electrodes of the SIM card defective.

As an example, a spring member 21 exists which extends inwardly from a surface opposite to the rising portion 12 of the card holding portion 17 (see FIG. 2 and FIG. 3). With this spring member 21, the card can be held in the tray 2 by applying a pressing pressure to the both ends of the card inserted into the tray 2. Therefore, rattles in the card position can be prevented, which is caused by a dimensional tolerance of the card.

If the tray 2 is opened from the closed state against the main body unit 1, as shown in FIGS. 4A and 4B, the upper surface of the tray 2 is pressed down against the spring force of the contact elements 11. The depression quantity is about 0.15 mm as an example.

In this way, the engagement between the front-portion tab 18 of the tray 2 and the hook portion 14 is released and the rear-portion tab 19 of the tray 19 is positioned at or below the height of the convex portion 16a formed on the upper surface of the horizontal portion of the see-through hole 16. Therefore, as shown in FIG. 4B, the tray 2 can be slid backwardly.

Assuming that the slide distance is approximate 2 mm as an example, as shown in FIG. 5B, the tab 19 bumps into a rear wall of the generally L-shaped see-through hole 16 and the backward movement of the tray 2 is constrained. At this point, the front-portion tab 18 of the tray 2 is located at the notch portion 13 of the rising portion 12 on either side of the main body unit 1. In other words, the tab 18 and the tab 19 is in the position enabling upward movement and, as shown in FIG. 4C and FIG. 5C, the tray 2 is lifted by the spring force of the spring member 20.

At this point, as shown in FIG. 5C, the position of the tab 19 is in the vicinity of the corner portion where the horizontal portion intersects with the vertical portion of the generally L-shaped see-through hole 16 and has a space allowing the tab 19 to rotate. Therefore, by holding up the front of the tray 2, the tray 2 is rotated around the tab 19 and an opening angle of the tray 2 is increased. FIG. 5D shows a state of tray 2 opened at an angle of 45 degrees and FIG. 5E shows a state of the tray 2 opened at an angle of 90 degrees.

When the tray 2 is closed, a reversed process of the above description is performed.

The opening width in the vertical direction is then considered for the generally L-shaped see-through hole 16 formed in the rising portion 12 of the present invention.

As enlarged and shown in FIGS. 5A to 5E, the tab 19 is formed integrally with a thin plate forming the tray 2 and has the same thin-plate shape. Therefore, for the transverse portion of the see-through hole 16 for moving the tab 19, the height needs only a height of the convex portion 16a plus a thickness of the thin plate. Therefore, a height of the rising portion 12 can also be reduced and, especially as compared to a embodiment configuration described in Japanese Patent Application Laid-Open Publication No. 2000-260537, the height of the connector can be lowered as a whole.

In the above descriptions, although the SIM card is taken as an example of a card inserted into the card holding portion 17, the applicable scope of the configuration of the present invention is not limited to such a SIM card. The configuration of the present invention can be applied to a RAM memory card corresponding to a purpose, a function card equipped with a CPU, etc.

While the illustrative and presently preferred embodiment of the present invention has been described in detail herein, it is to be understood that the inventive concepts may be otherwise variously embodied and employed and that the appended claims are intended to be construed to include such variations except insofar as limited by the prior art.

What is claimed is:

1. A card connector comprising:
   a main body unit having a panel portion including contact elements with a spring property, and having a rising portion on either side, the rising portion having at its front portion a notch portion followed by a hook portion, and having at its rear portion a generally L-shaped see-through hole,
   the L-shaped hole having a generally horizontal front portion and a generally vertical rear portion, the vertical rear portion having closed top portion so that an outer surface of the closed top portion is coplanar with an outer surface of the generally horizontal front portion; and
   the main body unit having a tray having a card holding portion for inserting a card, and having a front-portion tab and a rear-portion tab on either side, the rear-portion tab being bent outwardly from the card holding portion,
   wherein when the tray is closed, the front-portion tab is in a position for engaging with the hook portion and the rear-portion tab is in a position at an end of the horizontal portion of the generally L-shaped see-through hole to regulate the movement of the tray in the back-and-forth direction.

2. The card connector according to claim 1,
   wherein the card holding unit includes a spring member extending from a surface confronting the panel portion, and
   wherein as a process of a transition from a state of the tray closed to an opened state, an upper surface of the tray is pressed down against a spring property of the spring member, in the pressed-down state the front-portion tab is slid backward until the front-portion tab coincides with a position of the notch portion to put the tray into a lifted state, and when the front-portion tab is released from the notch portion and lifted upwardly, the rear-portion tab is rotated in the vicinity of a corner between a horizontal portion and a vertical portion of the generally L-shaped see-through hole.

3. The card connector according to claim 2,
wherein when a card is inserted into the tray, an upper surface of the tray is pressed down against a spring property of the contact elements applied via the inserted card, in addition to a spring property of the spring member.

4. The card connector according to claim 1,
wherein the tray is made of a thin plate, and wherein the front-portion tab and the rear-portion tab have the same thickness as the thin plate as portions of the tray.

5. The card connector according to claim 4,
wherein the card holding unit includes a spring member extending from a surface confronting the panel portion, and wherein as a process of a transition from a state of the tray closed to an opened state, an upper surface of the tray is pressed down against a spring property of the spring member, in the pressed-down state the front-portion tab is slid backward until the front-portion tab coincides with a position of the notch portion to put the tray into a lifted state, and when the front-portion tab is released from the notch portion and lifted upwardly, the rear-portion tab is rotated in the vicinity of a corner between a horizontal portion and a vertical portion of the generally L-shaped see-through hole.

6. The card connector according to claim 5,
wherein when a card is inserted into the tray, an upper surface of the tray is pressed down against a spring property of the contact elements applied via the inserted card, in addition to a spring property of the spring member.

7. The card connector according to claim 1, further comprising a convex portion on an upper side of a horizontal portion of the generally L-shaped see-through hole, the convex portion being engaged with the rear-portion tab to regulate the movement of the tray in the horizontal direction when the tray is closed.

8. The card connector according to claim 7,
wherein the card holding unit includes a spring member extending from a surface confronting the panel portion, and wherein as a process of a transition from a state of the tray closed to an opened state, an upper surface of the tray is pressed down against a spring property of the spring member, in the pressed-down state the front-portion tab is slid backward until the front-portion tab coincides with a position of the notch portion to put the tray into a lifted state, and when the front-portion tab is released from the notch portion and lifted upwardly, the rear-portion tab is rotated in the vicinity of a corner between a horizontal portion and a vertical portion of the generally L-shaped see-through bole.

9. The card connector according to claim 8,
wherein when a card is inserted into the tray, an upper surface of the tray is pressed down against a spring property of the contact elements applied via the inserted card, in addition to a spring property of the spring member.

10. A card connector comprising:
a main body unit having a panel portion including contact elements with a sprint property, and having a rising portion on either side, the rising portion having at its front portion a notch portion followed by a hook portion, and having at its rear portion a generally L-shaped see-through hole; and a tray having a card holding portion for inserting a card, and having a front-portion tab and a rear-portion tab on either side.

wherein when the tray is closed, the front-portion tab is in a position for engaging with the hook portion and the rear-portion tab is in a position at an end of a horizontal portion of the generally L-shaped see-through hole to regulate the movement of the tray in the back-and-forth direction, wherein the main body unit is made of mold resin, and wherein a metal plate reinforces the exterior of the rising portion on either side of the main body unit, the hook portion and the generally L-shaped see-through hole.

11. The card connector according to claim 10,
wherein the card holding unit includes a spring member extending from a surface confronting the panel portion, and wherein as a process of a transition from a state of the tray closed to an opened state, an upper surface of the tray is pressed down against a spring property of the spring member, in the pressed-down state the front-portion tab is slid backward until the front-portion tab coincides with a position of the notch portion to put the tray into a lifted state, and when the front-portion tab is released from the notch portion and lifted upwardly, the rear-portion tab is rotated in the vicinity of a corner between a horizontal portion and a vertical portion of the generally L-shaped see-through hole.

12. The card connector according to claim 11,
wherein when a card is inserted into the tray, an upper surface of the tray is pressed down against a spring property of the contact elements applied via the inserted card, in addition to a spring property of the spring member.

* * * * *

UNITED STATES PATENT AND TRADEMARK OFFICE
CERTIFICATE OF CORRECTION

PATENT NO. : 7,232,326 B2
APPLICATION NO. : 11/342115
DATED : June 19, 2007
INVENTOR(S) : Shiniji Uchida et al.

It is certified that error appears in the above-identified patent and that said Letters Patent is hereby corrected as shown below:

Title Page
Please correct the name of the first inventor from:

(75) Inventors: Shiniji Uchida, Yokohama (JP)

to

(75) Inventors: Shinji Uchida, Yokohama (JP)

Signed and Sealed this

Eighteenth Day of December, 2007

JON W. DUDAS
*Director of the United States Patent and Trademark Office*